United States Patent Office 3,386,964
Patented June 4, 1968

3,386,964
TERPOLYMERS OF ε-CAPROLACTAM, m-XYLYLENEDIAMINE, AND A DICARBOXYLIC ACID
Ian C. Twilley, Petersburg, Va., assignor to Allied Chemical Corporation, New York, N.Y., a corporation of New York
No Drawing. Filed Dec. 19, 1963, Ser. No. 331,940
2 Claims. (Cl. 260—78)

This invention relates to the production of novel polyamides, and more specifically to high strength linear polyamides of low moisture sensitivity comprising ε-caprolactam and other amide-forming species.

The spectrum of useful physical and chemical properties of linear polyamides has contributed to the widespread use of these polymers in the production of coatings and shaped objects. Useful polyamides are generally high molecular weight materials which as a class are microcrystalline in structure. The crystal structure is recognized to contribute significantly to the high strength, high melting point, hardness, and other desirable polymer properties. Although various monomer species may be employed in the production of high molecular weight polyamides, the use of ε-caprolactam has been found especially desirable in view of its simple method of polymerization and the high quality of polymers obtainable.

Polymeric materials have various affinities for moisture, depending upon their chemical and physical characteristics. In the production of polyamides suitable for use in the manufacture of molded or extruded shaped articles, the presence of moisture is undesirable since it vaporizes during the shaping operation and may form bubbles in the shaped product. Although it is possible to dry the polymer during its manufacture or just prior to shaping, the polymer, if not carefully protected from moisture during ordinary conditions of packaging, storage, and use, will reabsorb water from the ambient air at a rate dependent upon the equilibrium moisture absorption value for the composition. Although various physical and chemical techniques have been reported for modifying the moisture sensitivity of polyamides, it is generally found that concurrently, other desirable properties are adversely affected. It is known that modified polymers of caprolactam can be prepared by methods of interpolymerization with minor amounts of other monomer species. However, this approach has generally led to difficulties in obtaining useful molecular weights, and has led to structural disorder in the molecule with consequent decreased crystallization which is reflected in diminished polymer strength.

It is an object of the present invention to produce novel polymers from ε-caprolactam.

It is another object of this invention to provide novel ε-caprolactam-containing interpolymers having lower moisture absorption than homopolymers of ε-caprolactam and strength superior to said homopolymer.

It is another object of this invention to provide novel interpolymers from ε-caprolactam and other monomers, said interpolymers having a useful molecular weight, lower moisture absorption than homopolymers of ε-caprolactam, and strength superior to said homopolymer.

Other objects and advantages will become apparent hereinafter.

The objects of this invention are accomplished in general by preparing polymers from a mixture of caprolactam, meta-xylylenediamine, and a linear aliphatic dicarboxylic acid having seven to ten carbon atoms in the chain, said m-xylylenediamine and dicarboxylic acid being present as an approximately equimolar mixture comprising between 5% and 25% by weight of the interpolymer composition. The interpolymers thus prepared have a random distribution of monomer groups along the length of the polymer chain. The interpolymers desirably have an equlibrium moisture absorption less than about 2%, a formic acid relative viscosity between 45 and 138, and tensile strengths higher than the value of about 11,500 p.s.i. generally characteristic of homopolymers of ε-caprolactam.

The polymerization process for the preparation of the polymers of this invention may be carried out by any of the known condensation methods for preparing polyamides. In preferred methods, a monomer mixture is first prepared containing the desired proportions of ε-caprolactam and either the diammonium salt derived from the interaction of m-xylylenediamine with a linear aliphatic dicarboxylic acid containing seven to ten carbon atoms, or the individual m-xylylenediamine and dicarboxylic acid. The monomer mixture is charged to a reactor and heated for several hours under inert gas to about 255° C. The temperature of the melt is held at about 255° C. and water is removed from the mixture as it forms during the condensation until the desired degree of polymerization is obtained. The polymer can then be extruded from the reactor into a water quench bath and pelletized. The polymer can subsequently be washed to remove unpolymerized ingredients, and dried.

The following examples are presented to illustrate preferred embodiments of the present invention, and are not intended to be considered as limitative of the scope of the invention. All parts and percentages are by weight unless otherwise specified.

Example 1

1,600 grams of caprolactam were heated in a glass beaker at 80°–90° C. until melted. Then 216 grams of pimelic acid were dissolved into the molten lactam followed by 184 grams of m-xylylenediamine. This solution was charged to a reactor vessel and heated over a period of 1 to 1½ hours to 255° C. under a 30 cc./minute sweep of inert gas flowing against a back pressure of one inch of water. The temperature of the melt was maintained at 255° C. until the desired viscosity was reached. The polymer was extruded through the bottom of the reactor into a water quench bath, and pelletized. The polymer pellets were given four water washes at 100° C. to remove residual water solubles, commonly referred to as "monomer," and were dried under inert gas at 90° C. until the moisture content of the polymer was less than 0.2%.

The resulting random interpolymer has a formic acid relative viscosity of 45, as determined by ASTM test procedure No. D–789–53T. The polymer end groups, measured in equivalents per $10^6$ grams of polymer, are 62=$NH_2$ and 60=COOH. The melting point as determined on a Fisher-Johns apparatus is 200° C. The tensile strength is measured on ASTM microtensile specimens molded in a conventional molding machine, and tested by ASTM method D–638–59T. A tensile strength value of 13,800 p.s.i. is obtained. The moisture absorption, as measured by ASTM method D–570–57T which involves 24 hour immersion in water at 23° C., is 1.3%.

Example 2

1,800 parts of caprolactam were heated at 80°–90° C. until melted. 116 parts of azelaic acid were then added to the molten lactam, followed by 85 parts of m-xylylenediamine. The molten solution was then charged to a reactor and polymerized and processed in the manner described in Example 1.

The resulting random copolymer has a formic acid viscosity of 64, end groups of 54=NH and 36=COOH, a melting point of 210° C., a tensile strength of 13,000 p.s.i. and moisture absorption of 1.4%.

Example 3

1,800 grams of caprolactam were heated in a glass beaker at 80°–90° C. until melted. Then 119 grams of sebacic acid were dissolved in the molten monomer followed by 81 grams of m-xylylenediamine. This solution was charged to a reactor and polymerized and processed in the manner described in Example 1. The resulting random interpolymer has a formic acid relative viscosity of 65, end groups of 73=$NH_2$ and 28=COOH, melting point of 210° C., tensile strength of 12,300 p.s.i., and moisture absorption of 1.3%.

Examples 4–7

A number of interpolymers of this invention were prepared and tested using the procedures of Example 1. The polymers so produced are found to have desirable physical and mechanical properties. The results obtained are presented in Table I in comparison with caprolactam homopolymer, and interpolymer of ε-caprolactam with m-xylylenediamine and the six carbon acid, adipic acid, which is not one of the dicarboxylic acids used in accordance with this invention. As the data of Table I indicate, the adipic acid-containing polymer has a moisture absorption value even greater than that for caprolactam homopolymer. The interpolymers of this invention however, containing the seven to ten carbon linear dibasic acids are unexpectedly found to have moisture absorption values lower than that of the homopolymer, and tensile strengths greater than the homopolymer. The polymers obtained having formic acid relative viscosities between 45 and 138 are eminently suited for shaping into fibers and films of high strength and toughness. It is also seen that the interpolymers of this invention which have about 20% content of m-xylylenediamine dicarboxylic acid salt, exhibit a surprisingly high degree of transparency. The transparent polymers are well suited for use in optical applications and in the production of shaped articles by conventional extrusion and molding techniques.

Various conventional polymer additives may be incorporated into the interpolymers of this invention. Typical of such additives are: delusterants, pigments, flame retardants, anti-static agents, stabilizing agents, plasticizers, fluorescent whiteners, and the like, depending upon the final form and end use of the polyamide composition. The novel polymers of this invention may be employed in the production of end products such as textile yarns, tire yarns, bristles, films, molded products, and other shaped articles; and such end products may be subjected to commonly employed treatment processes such as dyeing, embossing printing, irradiation, drawing, machining, laminating, and other conventional operations.

It will be obvious to those skilled in the art that various changes may be made without departing from the spirit of the invention and therefore, the invention is not limited to what is described in the specification and examples, but only as indicated in the appended claims. For instance it will be evident to one skilled in the art that properties such as clarity and solubility of the specific products of the examples can be enhanced by replacing a part of one of the specific acids used, by another $C_8$–$C_{10}$ dicarboxylic acid or different dicarboxylic acid; and many like modifications will be readily apparent and may be adopted for purposes as indicated in the art.

TABLE I

| Composition [1] | Control A 10% C-6 | Ex. 4 10% C-7 | Ex. 1 20% C-7 | Ex. 5 10% C-8 | Ex. 2 10% C-9 | Ex. 6 20% C-9 | Ex. 3 10% C-10 | Ex. 7 20% C-10 | Control B Homo-polymer | Control C Homo-polymer |
|---|---|---|---|---|---|---|---|---|---|---|
| Formic Acid Viscosity | 93 | 138 | 45 | 136 | 64 | 58 | 65 | 51 | 70 | 37 |
| $NH_2$ Equivalents [2] | 49 | 36 | 62 | 38 | 54 | 51 | 73 | 76 | 48 | 65 |
| COOH Equivalents [2] | 30 | 31 | 60 | 32 | 36 | 37 | 28 | 31 | 51 | 69 |
| Melting Point, °C | 210 | 208 | 200 | 211 | 210 | 199 | 210 | 195 | 218 | 218 |
| Tensile Strength | 12,500 | 13,000 | 13,800 | 12,300 | 13,000 | 12,400 | 12,300 | 12,300 | 11,600 | 11,900 |
| 24-Hr. Moisture Absorption, percent | 1.9 | 1.4 | 1.3 | 1.6 | 1.4 | 1.4 | 1.3 | 1.4 | 1.8 | 1.8 |
| Clarity of Specimens Molded at a 180° F. Mold Temp. | (3) | (3) | (4) | (3) | (3) | (4) | (3) | (5) | (3) | (3) |

[1] Expressed in terms of the weight percent of the equimolar salt of m-xylylenediamine and the dicarboxylic acid employed where C-6=adipic acid, C-7=pimelic acid, C-8=suberic acid, C-9=azelaic acid, and C-10=sebacic acid. The remainder of the composition is essentially ε-caprolactam.
[2] Per $10^6$ grams of polymer.
[3] Opaque.
[4] Transparent at 0.05" thickness.
[5] Transparent at 0.03" thickness.

I claim:
1. A linear random interpolymer of 75% to 95% by weight ε-caprolactam, and essentially equimolar proportions of m-xylylenediamine and a linear aliphatic dicarboxylic acid having seven to ten carbon atoms in the chain.
2. The interpolymer of claim 1 having a formic acid relative viscosity between 45 and 138, a moisture absorption not above 2%, and a tensile strength in the range from at least 12,000 up to about 14,000 p.s.i. and substantially higher than ε-caprolactam homopolymer of equal formic acid relative viscosity.

References Cited
UNITED STATES PATENTS

| | | | |
|---|---|---|---|
| 2,130,948 | 9/1938 | Carothers | 260—78 |
| 2,252,555 | 8/1941 | Carothers | 260—78 |
| 2,893,980 | 7/1959 | Ham et al. | 260—78 |
| 3,240,732 | 3/1966 | Ham et al. | 260—78 |

WILLIAM H. SHORT, *Primary Examiner.*

SAMUEL H. BLECH, *Examiner.*

H. D. ANDERSON, *Assistant Examiner.*